July 7, 1936. W. F. KANNENBERG 2,046,686
ASYMMETRICAL ELECTRICAL CONDUCTOR
Filed May 22, 1934 2 Sheets-Sheet 1
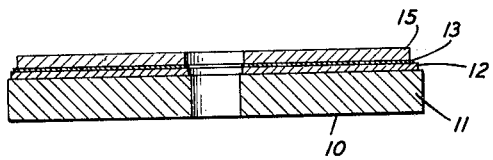
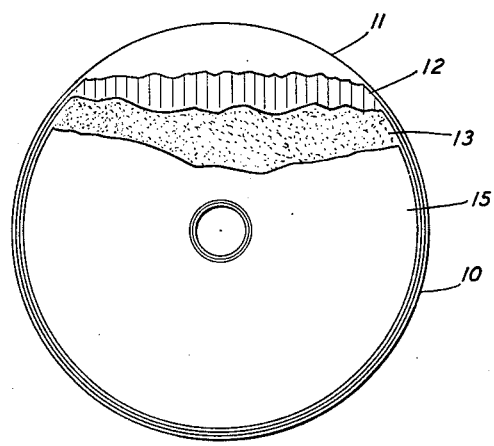
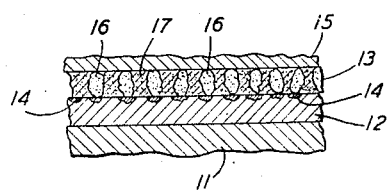 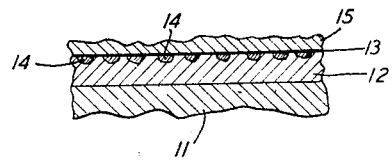
INVENTOR
W. F. KANNENBERG
BY
Walter C. Kiesel.
ATTORNEY July 7, 1936.  W. F. KANNENBERG  2,046,686
ASYMMETRICAL ELECTRICAL CONDUCTOR
Filed May 22, 1934  2 Sheets-Sheet 2

INVENTOR
W. F. KANNENBERG
BY
Walter C. Kiesel
ATTORNEY

Patented July 7, 1936

2,046,686

UNITED STATES PATENT OFFICE 2,046,686

ASYMMETRICAL ELECTRICAL CONDUCTOR

Walter F. Kannenberg, Lyndhurst, N. J., assignor to Bell Telephone Laboratories, Incorporated, New York, N. Y., a corporation of New York Application May 22, 1934, Serial No. 726,900

13 Claims. (Cl. 175—366)

This invention relates to asymmetrical electrical conductors, and, more particularly, to solid rectifying elements of the cuprous oxide type and their manufacture.

An object of the invention is to improve the electrical conductivity between the oxide coating of a cuprous oxide rectifier and an external circuit.

Another oject is to protect a solid rectifying element from injury and deterioration due handling, aging, or ordinary use.

A further object is to reduce or minimize leakage of current in the reverse or high resistance direction through a rectifier.

A still further object is to facilitate cooling of the rectifier and its maintenance at a safe and efficient operating temperature.

In forming an electrode of reduced copper on the oxide coating of a cuprous oxide rectifier, there is difficulty in securing sufficiently fine control of the reduction process, particularly with the smaller sizes of rectifier which are employed for instance, as modulating elements. Great precision is required in working with very thin oxide coatings to preserve high conductivity in the forward direction and to prevent puncture of the rectifying junction between the oxide and the mother copper. Similarly, a fine control is required in producing a plurality of matched rectifiers, in applying multiple electrodes to a single rectifier, and in producing a grid-like pattern of reduced copper on a rectifier for photoelectric purposes.

When a satisfactory electrode of reduced copper has been formed upon the oxide coating, it must be immediately and effectively protected from contact with the atmosphere or a second rectifying layer will be observed to form. This will be at the junction between the copper oxide and the reduced copper and being of reverse polarity with respect to the first rectifying layer, will greatly increase the forward resistance of the rectifier.

According to the present invention, the reduction process is controlled by scattering fine particles of graphite or zinc dust over the portion of oxide surface to be reduced and employing the particles as minute centers of reduction. Graphite is best adapted to an electrolytic reduction process, while zinc dust may advantageously be employed with acid as the reducing agent. In either process, the particles are held securely in place by some suitable cement, binder, or adhesive. Shellac has been found preferable as the adhesive in the electrolytic process as it constitutes a good electrolyte when first applied, but becomes a good insulator after it has become thoroughly dried.

In the electrolytic process, a mixture of graphite and shellac is applied to the surface, and, while still moist, a lead plate is pressed against the graphited surface, and a current is passed through the lead plate and the rectifier in the forward direction. The current is regulated to a suitable amount, and is maintained until a critical condition is reached, as will be described in detail hereinafter. The current is then cut off and the unit, still under pressure, is dried in an oven, or by other suitable means.

In the acid reduction process, the zinc dust is preferably applied with acetone in which a little celluloid has been dissolved as a binder. The mixture is spread evenly over the surface to be reduced, and allowed to dry. Dilute acid may then be applied in successive coats until the desired depth of reduction has been secured. The reduced surface is then brushed to remove the zinc dust, roughened slightly, and thereafter covered with a lead plate.

Either of the above described processes is adaptable to a cuprous oxide rectifier in the form of a wire or filament having an oxide coating. When this form is used, the malleable contact element may be in the form of a sleeve affixed to the wire under suitable pressure by means of a rolling operation. The lead sheath so formed may be backed up by a large mass of metal or provided with radiating fins to facilitate cooling of the rectifier. To reduce edge leakage, a wide band of uncovered oxide is provided. This band is tapered, preferably, to further increase the resistance of the leakage path for reverse currents. For forming the oxide on the wire, a heating current may be passed through the wire.

A more complete understanding of this invention will be obtained from the detailed description which follows, read with reference to the attached drawings, wherein:

Fig. 1 is a sectional view of a solid rectifying element embodying this invention;

Fig. 2 is a plan view of the device of Fig. 1 with successive layers broken away;

Fig. 3 is an enlarged sectional view of a fragment of a solid rectifying element in accordance with this invention;

Fig. 4 is an enlarged sectional view of a fragment of another solid rectifying element in accordance with this invention;

Figure 5:
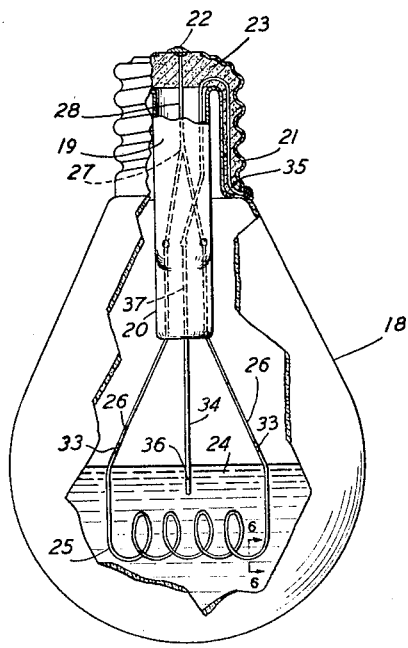
Fig. 5 is an elevational view of a rectifier enclosed in a bulb, shown partly broken away and partly in section, embodying a solid rectifying element in the form of a wire in accordance with this invention.

Figs. 1 and 2 show an electric current rectifier unit 10, comprising a disc or plate 11 of copper having an adherent, integral, thin layer or coating 12 of cuprous oxide formed on one surface by suitable heat treatment. The outer surface of the oxide layer is provided with a contact layer 13 comprising a multiplicity of spaced, reduced copper spots or areas 14, shown in enlarged detail in Figs. 3 and 4. This layer 13 is engaged by a contact washer or plate 15 of malleable metal, for instance, lead or tin-plated lead. The character of the layer 13 depends upon the method employed for producing the areas or spots of reduced copper. If the electrolytic process in accordance with this invention is employed, particles 16 of graphite are in contact with the areas 14, being held in position by a binder 17 of insulating material, which also seals or cements the contact washer to the layer 13. This is shown by Fig. 3. If the cold chemical process in accordance with this invention is employed, the layer 13 comprises merely the areas or spots 14, which, prior to the application of the washer 15, have been rubbed with finely divided graphite. This is shown by Fig. 4.

In carrying out the electrolytic process, a binder is chosen, which, preferably, when dissolved to form a cement, is readily electrolyzed, but which, when thoroughly dry is a reasonably good insulator. Dissolved shellac, clear lacquer, or a solution of celluloid in acetone may be employed, although shellac is preferred. The dissolved shellac is brushed liberally upon the outer surface of the cuprous oxide, and immediately thereafter the portion of the oxide to be covered by the contact washer is quickly and thoroughly graphitized. This may be done by rubbing the coated oxide surface with a lead pencil. As an alternative, powdered graphite could be mixed with the shellac prior to the application of the latter. Superfluous shellac may be removed by lightly blotting the evenly wetted surface with a smooth sheet of paper. The contact washer is then applied and clamped under pressure against the graphite-shellac film. Immediately thereafter a small electromotive force, for instance, about six volts, is applied to the unit to cause current flow in the forward or low resistance direction, i. e., from the oxide to the mother metal. The amount of reduction at the outer surface of the oxide, and the electrical characteristics of the rectifier are determined by the length of time this reducing current is maintained. For an optimum resistance ratio and, therefore, rectification ratio, the current should be interrupted at the moment that rapidity of current rise with time begins to fall off noticeably. If the reducing current is maintained beyond that point, the forward resistance is lower, but the reverse resistance decreases also, the resistance ratio being lower than the optimum. In the latter case, the reduction apparently extends out to the area between graphite points. If it assumed that the reducing current is interrupted at a time such that a unit having the optimum resistance ratio is obtained, the unit is then thoroughly dried under pressure so that electrolytic reduction will not proceed further as the unit is used. At room temperatures, this drying process may take from one to two weeks, but once completed, even overload currents, when the unit is in use as a rectifier, cause no further noticeable reduction.

As already stated, other organic materials besides shellac may be used. The chief requirement is that the binder, which later dries out and becomes an insulator, shall, while it is wet, reduce the oxide where contacted by the graphite particles during the passage of the reducing current. Assuming a uniform grade of oxide stock, the slower the rate at which the drying proceeds, the more exactly can the optimum resistance ratio be obtained and, it is evident, the easier it becomes to make successive units closely alike in final characteristics. The slower the drying proceeds, however, the longer must the units be maintained under the pressure prior to use. As a practical example, it may be stated that units made in accordance with this invention, and in which shellac was employed, required a drying period of at least a week; those using a clear lacquer, required a day; and those using a solution of celluloid in acetone, required only a few hours. The drying of the shellac may be hastened by the application of heat, up to 250° F. Units so treated for several hours were available for use immediately upon cooling to room temperature, and apparently were as good as units that had been slowly dried at room temperature.

The reduction process described has proven superior to the electrolytic processes heretofore used. The thickness of oxide reduced is so thin that extremely thin oxide surfaces can be treated without undue tendency of the oxide layer to puncture. Furthermore, the binder seals the freshly reduced surface, providing a forward resistance stability hitherto unattainable. The process lends itself well for production of rectifier units of any desired size. Units have been made having applied electrode or contact washer diameters of $\frac{1}{16}$ inch to 2½ inches. Current densities up to 80 amperes per square inch of applied electrode surface have been handled for short periods without difficulty in the smaller units, the very smallest of which having resistance ratios of over 1000 to 1.

Besides enabling the manufacture of stable high ratio rectifier units, this process makes possible the production of matched units. Matching implies that the units to be matched are to have the same forward current at a given voltage and temperature, as well as the same reverse current at a given voltage and temperature. This requirement, if it is to be rigorously met, implies not only the same size, configuration and placement of the electrodes, but, also, the same thickness of oxide at every point, the same formation and tempering history, and probably the same subsequent history. Accordingly, a copper sheet of large size having a layer of cuprous oxide on one surface is preferably used so that the desired number of units to be matched can all be cut from the same sheet. The oxide is thinned to a uniform and desired thickness, for instance, by brushing or wiping with a suitable acid. Punched tin plated lead washers are attached to the oxide surface at geometric intervals, being affixed thereto by the shellac graphite process outlined above. When the drying step is complete, the units may be sawed out, care being taken to maintain the same separation between the cut edges and the applied electrode edges, and to avoid bending or warping the sheet or the units. If measurement of the units establishes that certain of them have higher forward currents at a given voltage, trimming off the edges of the contact washer and removal of the reduced copper thus exposed, will result in the necessary increase in forward resistance so that all units pass the same current under the same conditions.

In the other or cold chemical process in accordance with this invention, the oxide surface to be reduced is coated uniformly with zinc dust suspended in a suitable carrier such as celluloid dissolved in acetone, only enough celluloid being used to lightly bind the dust particles to the oxide when the acetone has evaporated. When the coating is dry, dilute hydrochloric acid is applied to the dried dust film, the interaction of the zinc and the hydrochloric acid producing nascent hydrogen to cause reduction of the oxide surface at each spot or area engaged by a dust particle. In this way, a reduced metal film of uniform character over the surface of the oxide is produced. The degree to which the reduction proceeds is readily controlled by the number of applications of the acid. A single application, only, of the acid results in the spot reduction shown in Fig. 4. After the reduction operation is completed, the unit should be thoroughly washed to remove all traces of acid and zinc particles, dried, and, before use, polished or graphited or both on the film of reduced metal. Maximum stability of the rectifier unit's characteristics was attained when the contact washer 15 was pressed in place over the reduction film and sealed at its edges with an insulating varnish, impervious to moisture when dry.

Figure 6:
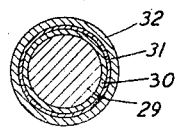
Fig. 6 is an enlarged sectional view of the wire in the device of Fig. 5 taken along the line 6—6 thereof.
Figure 7:
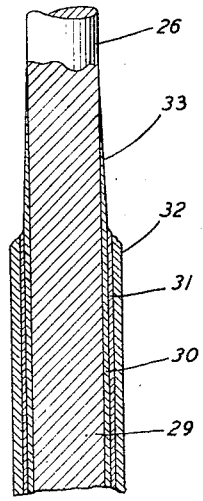
Fig. 7 is an enlarged sectional view of a fragment of the wire of the device of Fig. 5 lying above the surface of the material in which the coiled portion is located.

The device of Fig. 5 comprises a sealed tube or envelope 18, for instance, of glass, having a reentrant portion 19 and being provided with a standard incandescent lamp base comprising a ferrule 21 and a spot terminal 22 separated by ceramic or other insulating material 23. The enlarged end of the envelope contains a body 24 of mercury having a cuprous oxide rectifier in the form of a coil 25 immersed therein. The ends 26 of the wire constituting the coil extend out of the mercury, are sealed in the arbor 20 of the envelope, and are joined together at 27, and connected through the extension 28 with the terminal 22. Fig. 6 is a cross sectional view of the coil material. It comprises a core 29 of copper wire having a layer 30 of cuprous oxide thereon treated in accordance with either of the processes described hereinabove, the malleable contact washer comprising a sleeve or sheath 31 of lead having an outer covering or layer 32 of a suitable low temperature alloy, for instance, a lead alloy comprising lead, antimony and bismuth. The outer covering 32 facilitates cooling when the rectifier is in use, and exerts, also a compressive force on the sleeve 31 to improve its contact with the outer surface of the oxide. Fig. 7 shows in enlarged cross section that portion of the copper wire immediately above the surface of the mercury. A cylindrical band 33 of cuprous oxide is left exposed, and tapers gradually down to the bare wire. Such an arrangement greatly increases the resistance offered by the rectifier to reverse or leakage currents. The conductor or wire 34, of any suitable metal, has one end 35 attached to the ferrule 21, its other end 36 immersed in the mercury, and an intermediate portion 37 sealed in the arbor 20 in insulated and spaced relation to the rectifier wire. In operation, the low resistance or forward current path is from the ferrule, through the conductor 33, mercury 24, coil 25 to terminal 22.

Although this invention has been disclosed with reference to various specific embodiments thereof, it will be understood that modifications thereof are possible without departing from the spirit of the invention, the scope of which is to be considered as limited by the appended claims, only.

What is claimed is:

1. The method of producing a reduced copper surface on the cuprous oxide layer of a cuprous oxide rectifier which comprises placing upon the oxide surface a plurality of conductive particles in a binder that electrolyzes in solution but is an insulator when dry, the binder being applied in a wet condition, and passing a reducing current through said rectifier while the binder is in that condition.

2. The method of affixing an electrode to the cuprous oxide coating of a copper oxide rectifier which comprises placing upon the oxide surface a plurality of conductive particles in a binding matrix, reducing to metallic copper a restricted area of the oxide surface in contact with each of a plurality of said conductive particles, and placing a metallic electrode in contact with the surface so prepared.

3. The method of affixing an electrode to the cuprous oxide coating of a copper oxide rectifier which comprises placing upon the oxide surface a plurality of conductive particles in a binding matrix including a volatile electrolyte, pressing a metallic electrode upon the surface so prepared, passing electric current through the matrix in such direction and for such time as to form a restricted area of reduced copper upon the oxide surface in contact with each of a plurality of said conductive particles, and drying said matrix still under pressure until the electrolyte has volatilized and the binder has set.

4. The method of affixing an electrode to the cuprous oxide coating of a copper oxide rectifier which comprises placing upon the oxide in a binding matrix a plurality of particles of a conductive substance electro-positive compared to copper, drying said matrix, applying acid to the matrix to form a restricted area of reduced copper upon the oxide surface in contact with each of a plurality of said conductive particles, washing the treated oxide, and pressing a soft metallic electrode upon the treated oxide surface.

5. The method of affixing an electrode to the oxide coating of a cuprous oxide rectifier which comprises placing upon said oxide in a binding matrix, a plurality of particles of zinc, drying said matrix, applying dilute hydrochloric acid to the matrix to form areas of reduced oxide on the oxide in contact with each of the zinc particles, washing the oxide and placing a soft metallic electrode upon the prepared oxide surface.

6. An asymmetrical electrical conductor comprising a body of copper having a copper oxide coating thereon, the outer surface of said oxide having separated areas of reduced copper thereon.

7. A solid rectifying element comprising a body of copper having a coating of cuprous oxide thereon, the outer surface of said oxide having spaced areas of reduced copper thereon.

8. An electric current rectifier comprising a body of copper having a layer of cuprous oxide thereon, and a reduced copper layer on said oxide comprising a plurality of spaced areas of reduced copper.

9. An electric current rectifier comprising a body of copper having a layer of copper oxide thereon, a plurality of conductive particles in contact with the outer surface of the oxide layer and separated from each other, a plurality of separated areas of reduced copper on the oxide surface, each of said particles being in electrical contact with one of said reduced copper areas, a metallic body in contact with said particles, and means surrounding each individual particle to prevent movement between said particles and the respective reduced areas and between said particles and said metallic body.

10. An electric current rectifier comprising a body of copper having a layer of copper oxide thereon, and a contact member engaging a portion of said oxide layer with a margin of unused oxide surrounding said member, said marginal portion having a tapered thickness decreasing toward its outer edge.

11. An electrical conductor comprising a body of copper having a copper oxide coating thereon, the outer surface of said oxide having separated areas of reduced copper thereon, a conductive particle in contact with each such reduced copper area, and means maintaining said particles in position.

12. An electrical conductor comprising a body of copper, a cuprous oxide coating thereon, a plurality of separated areas of reduced copper on the outer surface of the oxide, a carbon particle in contact with each reduced copper area, a binder for said particles of material which when dissolved is electrolyzable and which when dry is an insulator, and a contact plate overlying said particles and binder and sealed thereto by said binder.

13. The method of producing a reduced copper surface on the oxide layer of a cuprous oxide coated copper body, which comprises placing upon the oxide surface a plurality of conductive particles in a binder that electrolyzes in solution but is an insulator when dry, the binder being applied in a wet condition, and passing a reducing current through said body while the binder is in that condition.

WALTER F. KANNENBERG.